July 25, 1944.  F. W. RADFORD  2,354,612
POULTRY FEEDER
Filed July 17, 1943
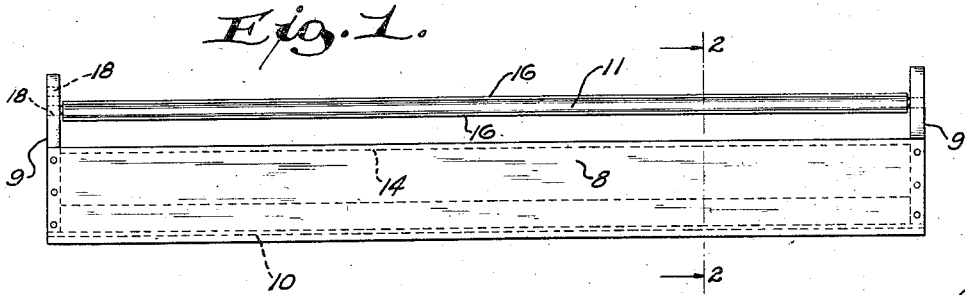
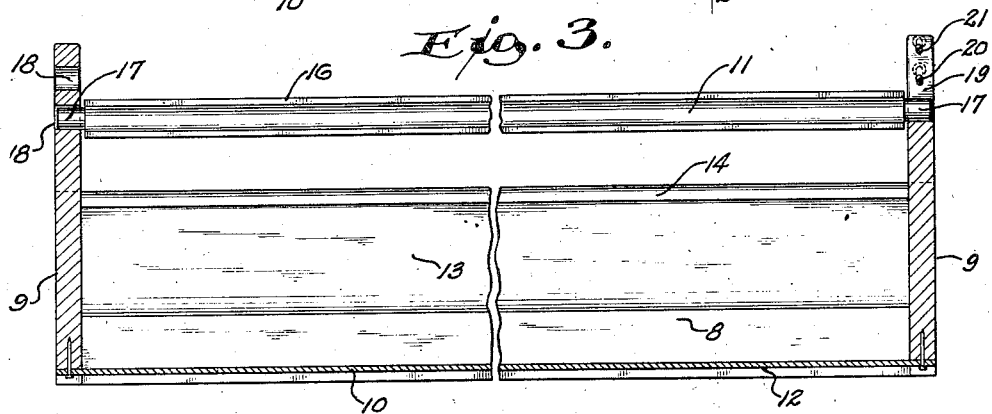
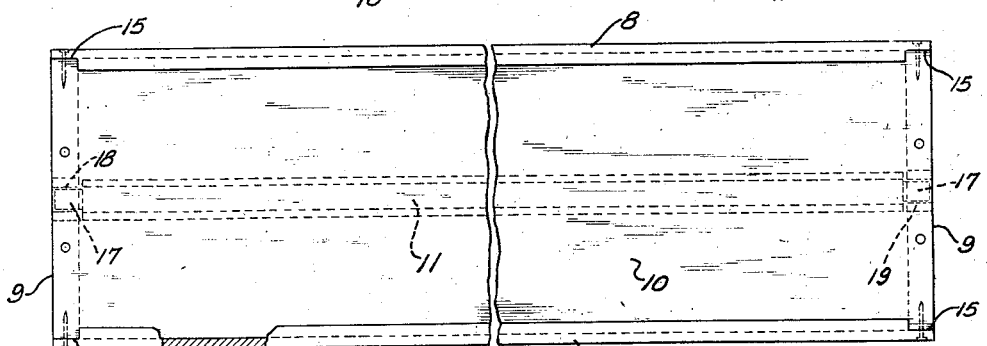
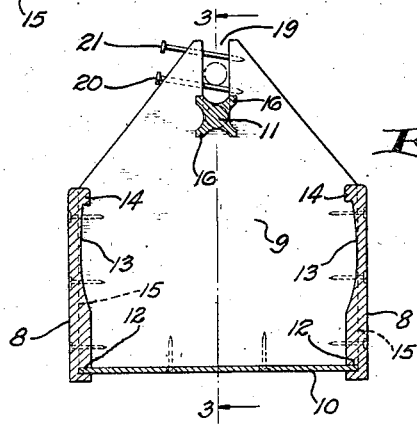
INVENTOR.
Frank W. Radford,
BY Morsell & Morsell
ATTORNEYS.

Patented July 25, 1944

2,354,612

UNITED STATES PATENT OFFICE 2,354,612

POULTRY FEEDER

Frank W. Radford, Oshkosh, Wis., assignor to The Radford Company, Oshkosh, Wis., a corporation of Minnesota Application July 17, 1943, Serial No. 495,111

3 Claims. (Cl. 119—61)

This invention relates to improvements in poultry feeders.

A general object of the present invention is to provide a durable, inexpensive, and effective non-metallic poultry feeder.

A further object of the invention is to provide a poultry feeder having wooden side members shaped to form at their upper longitudinal margins integral inwardly projecting lips to prevent feed from being worked over the sides.

A further object of the invention is to provide a wooden sided poultry feeder wherein edge portions of the sides are formed with shouldered recesses for the elevated insertion of a bottom and for the flush insertion of end members.

A further object of the invention is to provide a poultry feeder equipped with an adjustable reel, the reel being shaped and designed to discourage roosting thereon.

A further object of the invention is to provide a wooden poultry feeder which is of very simple construction, which is strong and durable, which is easy and inexpensive to manufacture and assemble, which utilizes a minimum number of parts, which is neat and attractive in appearance, and which is well adapted for the purposes described.

With the above and other objects in view the invention consists of the improved poultry feeder, and its parts and combinations as set forth in the claims, and all equivalents thereof.

In the accompanying drawing in which the same reference characters indicate the same parts in all of the views:

Fig. 1 is a side view of the improved poultry feeder;

Fig. 2 is a transverse vertical sectional view taken on line 2—2 of Fig. 1, and on a larger scale;

Fig. 3 is a longitudinal vertical sectional view of the poultry feeder taken on line 3—3 of Fig. 2; and Fig. 4 is an enlarged bottom view of the poultry feeder with parts broken away and in section.

Referring now more particularly to the drawing it will appear that the improved poultry feeder is an elongated trough-like structure comprising spaced apart parallel side walls 8, end walls 9, and a bottom 10. The end walls 9 are extended substantially above the upper edges of the side walls and the extended portions of said end walls are of substantially triangular formation. Between the extended portions of the end walls there is an elevated, adjustable longitudinal reel 11. All portions of the poultry feeder, save the bottom, are constructed of wood, and the bottom member 10 is of fiberboard which is resistant to weather. The wood portions may be treated to prevent decay and the material of the walls eliminates rusting, denting and twisting.

A particular feature of the invention resides in the construction, formation and shape of the side walls 8. It will be noted from Fig. 2 that the lower inner portions of said side walls are grooved as at 12 and said grooves accommodate the longitudinal side marginal portions of the fiberboard bottom 10 which has its ends nailed or otherwise secured to the lower raised surfaces of the end walls 9. The fiberboard bottom is, therefore, slightly elevated from the ground with the vertical shouldered portions of the sides 8 forming longitudinal legs. The sides 8, above the bottom 10, are of substantial thickness but from the intermediate portions thereof upwardly the inner faces of the sides are formed with longitudinally extending concavities or recesses 13 which terminate adjacent the upper margins of the sides in sharp inwardly projecting shoulders or lips 14. At the extremities of the sides 8, extending inwardly from the inner faces of the sides, are dadoes 15 to receive the edge portions of the end members 9. The ends may be held within the dadoes between the sides by nails or other suitable securing means, as shown.

It will therefore be noted that the wooden side members 8 are of integral or one-piece construction and that their substantial breadth permit the formation of the lower grooves for the insertion of the bottom 10, the formation of the end vertical dadoes 15 for the flush insertion of the end members 9, and the formation of the inner face longitudinal curved grooves 13 which provide inwardly projecting lips or shoulders 14 at the top inner edges of the sides. The inturned lips 14 are integral with the sides and eliminate the necessity of auxiliary strips or shoulders on the sides. Said lips on the inside edges of the sides are important in preventing the poultry from billing the mash or feed out of the feeder.

The reel 11, of wood formation, extends centrally longitudinally of the open upper end of the feeder and is shaped in cross-section as best shown in Fig. 2, having radial projections or ribs 16 separated by concave recesses. The outer extremities of the ribs 16 are angular to form sharp edge portions to discourage poultry from roosting on the reel, and facilitate turning movements of the reel should a chicken light thereon. The opposite extremities of the reel are reduced or rounded, as at 17, providing bearing shaft portions.

One of the end walls 9 is formed with a pair of spaced vertically alined apertures 18 in its extended portion, said apertures being for the purpose of selectively rotatably receiving the reduced shaft portion 17 at one end of the reel. The other end wall 9 has in its upper extension and positioned to correspond with the location of the apertures 18, a vertical U-slot 19 in which the shaft portion 17 at the corresponding end of the reel is engaged. If the reel is to be located in its lowermost position, one end 17 of the reel is lodged within the lower aperture 18 and the other end 17 of the reel is lodged within the bottom portion of the U-slot 19, as shown in Fig. 2. An elongated nail or pin 20 may be inserted into registering bores to position over the end of the reel to prevent displacement of the same from the slot. If the reel is to be located in its upper position of adjustment an end 17 of the reel is located in the uppermost aperture 18 and the other end of the reel is lodged within the U-slot 19 over the inserted nail 20 and below a second removable nail 21. The nails 20 and 21 are, of course, readily removable to permit lifting the reel out of the slot 19 for withdrawal of the opposite end of the reel from the engaged aperture 18.

The improved non-metallic poultry feeder is obviously of very simple construction and utilizes a minimum number of parts. The specific formation of the sides 8 results in a strong and sturdy construction and permits the effective flush mounting of the ends and raised mounting of the bottom, as described, together with the integral formation of the upper in-turned lips. The improved poultry feeder is relatively easy and inexpensive to manufacture and assemble, is durable, and is well adapted for the purposes set forth.

What is claimed as the invention is:

1. A non-metallic poultry feeder, comprising an open top container formed from connected together wooden sides, wooden ends, and a fiberboard bottom, the sides being of substantial thickness and having their inner faces each formed with a longitudinal, relatively wide concavity which terminates in an abrupt, inwardly projecting, integral retaining lip at the upper margin of a side.

2. A non-metallic poultry feeder, comprising spaced-apart wooden side members of substantial thickness and formed with shouldered recesses along their vertical end edges and with shouldered recesses along their lower longitudinal edges, said sides also having the upper portions of their inner faces formed with wide longitudinally extending concavities terminating in inwardly projecting, longitudinal, integral, retaining lips at their upper margins, wooden end members having their vertical side edges secured within the vertical shouldered recesses of the side members, the wooden end members extending substantially above the upper margins of the sides, a flat fiberboard bottom member having its opposite longitudinal edge portions secured within the longitudinal shouldered recesses of said side members and slightly elevated relative to the base portions thereof, and a vertically adjustable and removable wooden reel mounted longitudinally over the container with its extremities journalled in the upwardly extended portions of the ends, the major portions of said reel having radial, angularly shaped ribs with sharp outer edge portions.

3. A poultry feeder, comprising an open top container formed from connected together sides, ends and a bottom, the ends extending above the upper margins of the sides, one of the extended end portions being formed with a pair of vertically spaced sockets and the other of said extended end portions being formed with an upwardly opening slot, removable means extended into said last-mentioned end portion and across portions of the slot to selectively divide the slot into sockets corresponding in elevation with the sockets in the other end portion, and a reel mounted longitudinally over the container and having a pair of shafts at opposite ends thereof, said shafts being removably journaled in selected corresponding sockets in said end portions.

FRANK W. RADFORD.